Nov. 8, 1966  D. L. PLATUS ET AL  3,283,857
BEAM ENERGY ABSORBING DEVICE
Filed July 16, 1963
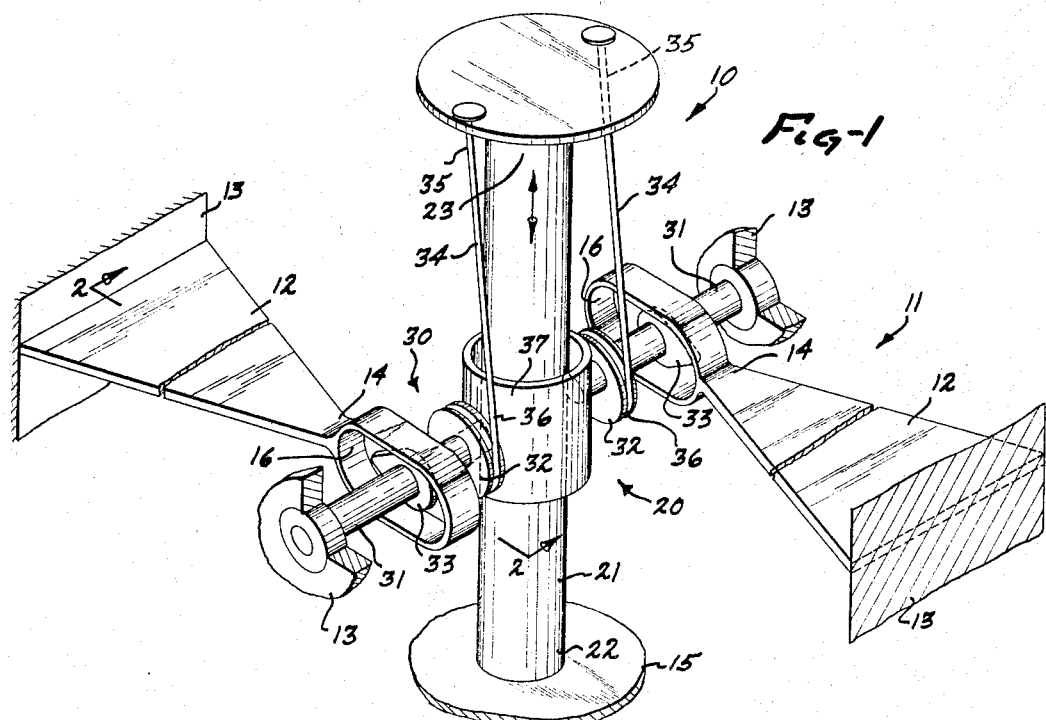
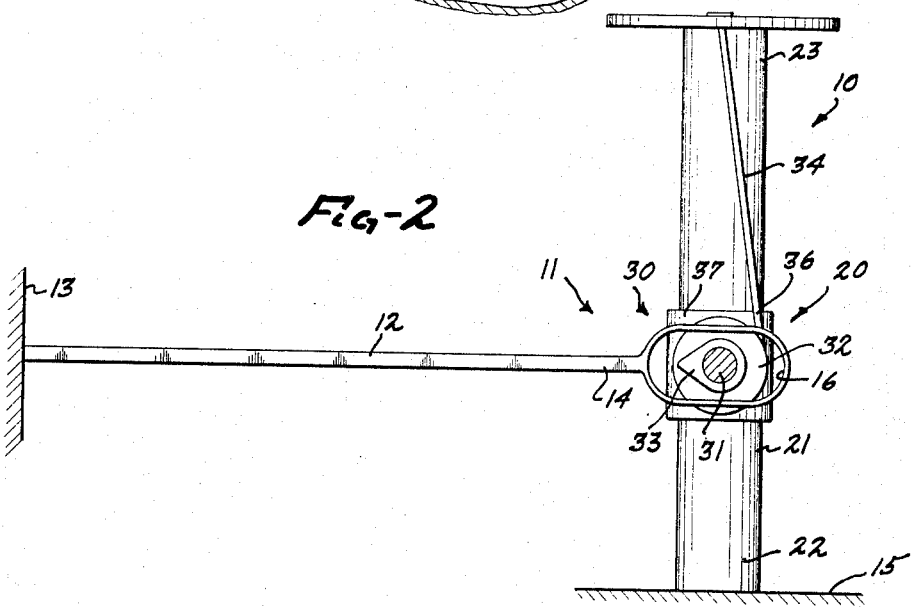
INVENTORS.
DAVID L. PLATUS
FRANK A. MAROVICH
PATRICK J. CUNNINGHAM
BY
Albert M. Herzig
ATTORNEY

# United States Patent Office 3,283,857
Patented Nov. 8, 1966

3,283,857
BEAM ENERGY ABSORBING DEVICE
David L. Platus, Covina, Frank A. Marovich, Hacienda Heights, and Patrick J. Cunningham, Fullerton, Calif., assignors to Ara, Inc. (Aerospace Research Associates, Inc.), West Covina, Calif., a corporation of California
Filed July 16, 1963, Ser. No. 295,317
5 Claims. (Cl. 188—1)

In general, the present invention relates to a lightweight, high energy absorbing device. More particularly the present invention relates to a beam energy absorbing device adapted to absorb unidirectional mechanical energy by the cyclic plastic deformation of a piece of solid material. As used in the present application, the term "mechanical energy" may be defined according to its conventional definition, i.e., a force acting through a distance. Thus, the term "mechanical energy" includes not only the kinetic energy associated with a moving body, but also the energy associated with situations such as relieving the overload on a structure without damage to the structure. Also, as used in the present application the term, "cyclic plastic deformation" refers to the deformation of any piece of solid material around a hysteresis curve wherein a substantial amount of energy is absorbed during the course of a complete cycle.

At present, there are a wide variety of energy absorbing devices known which are adapted to cushion the impact of the apparatus being protected when it is required to bring it to a sudden stop. A common example of such energy absorbing devices are conventional hydraulic-mechanical devices such as dashpots. However, such conventional hydraulic-mechanical energy absorbing devices are capable of absorbing relatively limited amounts of energy during a single impact and are relatively heavy, bulky devices. For example, a typical hydraulic-mechanical device now on the market has the capacity of absorbing 1000-foot pounds of energy per pound of weight during a single impact. Because of the low capacity and high weight of such conventional hydraulic-mechanical devices, energy absorbing devices have been developed which achieve very high specific energy absorption, i.e., large amounts of foot pounds of energy absorbed per pound of weight of the device, but such devices usually require their substantial destruction during the course of a single impact. The most efficient such single impact energy absorption device now known is probably the frangible tube device having a specific energy absorption of about 30,000 foot-pounds per pound, although similar devices such as crushable materials and gas-filled collapsible shells are known. However, such single impact devices have only very limited usefulness because they usually require replacement after only one use and thus are not suitable in any situation which requires several impacts.

In general, therefore, an object of the present invention is a lightweight, high energy absorbing device which may be utilized to cushion a substantial number of impacts.

Another object of the present invention is a beam energy absorbing device adapted to absorb unidirectional mechanical energy by cyclic plastic deformation of a solid piece of material.

Other objects and advantages of the present invention will be readily apparent from the following description and drawings which will illustrate at least one preferred exemplary embodiment of the present invention.

In general, this invention involves a beam energy absorbing device which comprises a beam energy absorbing means and an energy transmitting means for imposing on said beam energy absorbing means substantially bending deformation and reverse bending deformation in response to mechanical energy applied thereto. Operatively associated with both of said means is a cycling means for converting unidirectional mechanical energy applied to said energy transmitting means into cyclic plastic substantially bending deformation and reverse bending deformation of said beam energy absorbing means.

In order to facilitate understanding of the present invention reference will now be made to the appended drawings of a preferred specific embodiment of the present invention. Such drawings should not be construed as limiting the invention which is properly set forth in the appended claims.

In the drawings:

FIGURE 1 is a perspective view of a specific embodiment of a beam energy absorbing device of the present invention.

FIGURE 2 is a cross-sectional view of FIGURE 1 taken along the line 2—2 of FIGURE 1.

As illustrated in FIGS. 1 and 2, the present invention involves a beam energy absorbing device 10 including a beam energy absorbing means 11 and an energy transmitting means 20 for imposing on said beam energy absorbing means 11 substantially bending deformation and reverse bending deformation in response to mechanical energy applied thereto. A cycling means 30 converts unidirectional mechanical energy applied to the energy transmitting means 20 into a cyclic plastic deformation of the beam energy absorbing means 11.

The beam energy absorbing means 11 comprises cantilevers 12 which are mounted on the device 13 (not shown) to be protected. Preferably, as illustrated, the cantilevers 12 are tapered to have a constant bending moment per unit width. The energy transmitting means 20 comprises a column 21 substantially perpendicular and adjacent to the free ends 14 of the cantilevers 12. As illustrated, the cantilevers 12 are circumferentially spaced around the column 21 and the column 21 is attached at its first end 22 to a guard 15 (not shown) for the device 13. The guard 15 is adapted to make the initial contact with the ground when the device 13 is dropped to the ground. The cycling means 30 comprises a series of rods 31 rotatably mounted between the cantilevers 12 and the column 21. The first end 31a of the rod 31 is rotatably mounted in a sleeve 37 which is slidably mounted on the column 21. The second end 31b of the rod 31 is rotatably mounted in the device 13. Each of the rods 31 has a spool 32 and a cam 33 coaxially mounted thereon. The cycling means 30 also includes cords 34 having their first end 35 attached to the free end 23 of the column 21 and having their second end 36 wound around the spool 32. Each cam 33 is rotatably mounted in a corresponding slot 16 in the free end 14 of the cantilevers 12. The slots 16 and the cams 33 are adapted to impose on the cantilevers 12 cyclic plastic substantially bending deformation and reverse bending deformation by the rotation of the cams 33 in the slots 16.

If the device 13 is dropped so that the guard 15 strikes the ground, the column 21 is jolted upwardly. Such impact is translated through the cords 34 to the spools 32 so that the rods 31 are rapidly rotated as the column 21 moves upwardly with respect to the sleeve 37. The rotation of the rods 31 in turn causes the rotation of the cams 33 in the slot 16 of the cantilevers 12 and thus cyclic plastic substantially bending deformation and reverse bending deformation of the cantilevers 12. Consequently, the energy impact is absorbed by the cantilevers 12 with a resulting increase in their temperature and the device 13 is cushioned against the major portion of the impact.

As set forth above, the beam energy absorption device of the present invention includes a beam energy absorbing means which is subjected to cyclic plastic substantially bending deformation and reverse bending deformation. Thus, any deformable solid material which exhibits a hysteresis curve enclosing a substantial area may be utilized in the present invention. Materials which may be used in the present invention include not only metals such as steel, copper, titanium, brass, etc., but also non-metals such as plastics, natural and synthetic rubbers and elastomers of various kinds such as polyurethane elastomers. In fact, analysis indicates that non-metals such as polyurethane elastomers, would be superior in a beam energy absorbing means compared to metals such as titanium when a moderate number of impacts is involved such as ten or more. In addition, non-metallic pieces of material such as plastic and rubbers offer the further advantage of large deformation with low stresses. Thus, stability problems can be reduced and the strength and weight of redundant structures can be reduced.

Many other specific embodiments of the present invention will be obvious to one skilled in the art in view of this disclosure. For example, the beam energy absorbing means may utilize a bar which is fixed at both ends rather than a simple cantilever or the illustrated tapered cantilever. Also, a hollow bar or tube might be utilized, but a solid structure is preferred, since it increases the weight of the working material which can be utilized in a given space. Similarly, a variety of energy transmitting means and cycling means may be utilized. Thus, in the embodiment of the invention illustrated, a rack and pinion arrangement may be used in place of the spool to translate the unidirectional thrust of the column into rotation of the rod. Hence, any mechanical means which converts linear motion into oscillatory motion may be used in the present invention. Also, although the unidirectional energy absorption involved in the present invention is customarily the energy associated with linear motion, angular motion can equally well be absorbed by cyclic plastic deformation.

It should be noted that the present invention may be utilized to relieve the overload on a structure without damage to a structure. For example, the present invention may be inserted in a length of cable and designed so that its "threshold force" succeeds the normal load which the cable should carry. By "threshold force" applicants refer to the force required to initiate movement of the energy transmitting means with respect to the beam energy absorbing means. When the load exceeds such force, the device permits the cable to lengthen a substantial distance but still maintain its integrity. Thus, the present invention may involve movement for a substantial distance under a constant load. After the cable has lengthened to such an extent, then other means may be employed to support the increased load.

There are many features in the present invention which clearly show the significant advance the present invention presents over the prior art. Consequently, only a few of the more outstanding features will be pointed out to illustrate the unexpected and unusual results obtained by the present invention. One feature of the present invention involves the cyclic plastic substantially bending deformation and reverse deformation. Such deformation results in substantially uniform straining of various portions of the piece of working material over relatively small amplitudes of strain. Thus, strain concentrations and instabilities are substantially minimized and the working life of the material until failure is greatly prolonged.

Another feature of the present invention is the utilization of cyclic plastic deformation to achieve very high energy absorption using lightweight working material. Thus, the specific energy absorption of the present invention is very high.

Another feature of the present invention is that it may be utilized for a substantial number of impacts. By designing the beam energy absorbing device of the present invention to absorb small amounts of energy per plastic deformation cycle and utilizing a large number of cycles to the failing point of the working material, substantially larger total energy absorption may be achieved. Thus, in general, the larger the number of cycles through which the working material is projected, the higher the energy absorption obtained.

Still another feature of the present invention is that energy absorption is achieved with a relatively simple, inexpensive device which has a high reliability in operation and requires substantially no maintenance. Thus, the present invention may be employed as a safety device which can be installed and then ignored, but which is ready to operate when an emergency occurs.

Still another feature of the present invention is that it permits regulation of load deflection or deceleration time behavior merely by proper design of the device. For example, when used as a cable safety device, the present invention does not operate until a predetermined "threshold force" is reached and then it moves through a large stroke under constant force. Also, when used as a deceleration device, the resisting force of the device is relatively independent of the impact velocity.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of the disclosure are considered part of the present invention.

What is claimed is:

1. An energy absorbing device comprising: a body of material capable of being deformed by bending and thereby absorbing energy; a movable member; means guiding said movable member along a predetermined path relative to said body of bendable material; motion transmitting means connected to said movable member and said body of bendable material and arranged to effect cyclic and repeated bending of said body, in opposite directions, in response to movement of said member along said path in one direction.

2. A device as defined in claim 1 wherein said body is of bendable metal.

3. An energy absorbing device comprising: a body of material capable of being deformed by bending and thereby absorbing energy; a movable member; means guiding said movable member along a predetermined path relative to said body of bendable material; motion transmitting means connected to said movable member and said body of bendable material and arranged to effect cyclic and repeated bending of said body, in opposite directions, in response to movement of said member along said path in one direction, said bendable body being a cantilever beam, fixedly supported at one end thereof, said motion transmitting means being connected to the other end of said beam.

4. An energy absorbing device comprising: a body of material capable of being deformed by bending and thereby absorbing energy; a movable member; means guiding said movable member along a predetermined path relative to said body of bendable material; motion transmitting means connected to said movable member and said body of bendable material and arranged to effect cyclic and repeated bending of said body, in opposite directions, in response to movement of said member along said path in one direction, said motion transmitting means comprising a rod rotatably mounted between said movable member and said bendable body, said rod having a spool and a cam coaxially mounted thereon; a cord having its first end attached to said movable member and its second end wound around said spool; and a slot in said bendable body with said cam rotatably mounted therein, said slot and cam being adapted to impose on said bendable body cyclic plastic bending deformation and reverse bending deformation by the rotation of said cam in said slot.

5. A beam energy absorbing device comprising:
(a) a beam energy absorbing means for absorbing unidirectional mechanical energy by cyclic plastic bending deformation and reverse bending deformation comprising at least one cantilever;
(b) an energy transmitting means for imposing on said cantilever substantially bending deformation and reverse bending deformation in response to mechanical energy applied thereto; and
(c) cycling means for converting unidirectional mechanical energy applied to said energy transmitting means into cyclic plastic substantially bending deformation and reverse bending deformation of said beam energy absorbing means, said cycling means comprising:
  (I) a rod rotatably mounted between said cantilever and said energy transmitting means, said rod having a spool and a cam coaxially mounted thereon;
  (II) a cord having its first end attached to said transmitting means and a second end wound around said spool; and
  (III) a slot in the free end of said cantilever with said cam rotatably mounted therein, said slot and cam being adapted to impose on said cantilever cyclic plastic bending deformation and reverse bending deformation by the rotation of said cam in said slot.

References Cited by the Examiner
UNITED STATES PATENTS

| | | | |
|---|---|---|---|
| 3,026,972 | 3/1962 | Hendry et al. | 188—1 |
| 3,089,564 | 5/1963 | Smittle | 188—1 |

DUANE A. REGER, *Primary Examiner.*

ARTHUR L. LA POINT, *Examiner.*